United States Patent [19]

Takenaka

[11] Patent Number: 5,157,437
[45] Date of Patent: Oct. 20, 1992

[54] APPARATUS AND METHOD FOR CHECKING COINCIDENCE BETWEEN FRAME SPECIFICATION DATA AND AN ACTUAL FRAME OF AN AUTO-PRINTER

[75] Inventor: Yuji Takenaka, Kanagawa, Japan

[73] Assignee: Fuji Photo Film Co., Ltd., Kanagawa, Japan

[21] Appl. No.: 804,435

[22] Filed: Dec. 10, 1991

[30] Foreign Application Priority Data

Dec. 10, 1990 [JP] Japan ................................. 2-409805

[51] Int. Cl.⁵ .......................................... G03B 27/52
[52] U.S. Cl. ........................................ 355/41; 355/77
[58] Field of Search ................. 355/40, 41, 77, 50; 353/26 A, 27 A

[56] References Cited

U.S. PATENT DOCUMENTS

| | | | |
|---|---|---|---|
| 4,918,484 | 4/1990 | Ujiie et al. | 355/41 |
| 4,933,713 | 6/1990 | Tsuji et al. | 355/41 |
| 4,965,628 | 10/1990 | Olliver et al. | 355/41 |
| 5,119,126 | 6/1992 | Tokuda | 355/41 |
| 5,122,645 | 6/1992 | Saeki et al. | 355/41 X |

FOREIGN PATENT DOCUMENTS 63-305336 12/1988 Japan .

Primary Examiner—Richard A. Wintercorn
Attorney, Agent, or Firm—Sughrue, Mion, Zinn, Macpeak & Seas

[57] ABSTRACT

In an auto-printer, wherein original frames to be printed are sequentially and automatically printed at an optimum exposure amount, which is determined based on frame specification data which includes exposure correction data, frame number and position data and stored during negative inspection. The frame position data is compared with an actual amount of film advancement detected when advancing the frame toward a print position, so as to determine whether the frame specification data corresponds to the actual frame placed in the print position. Simultaneously, the actual frame number of the frame placed in the print position is determined based on frame number bar code read from the photographic film during advancing the film, so as to compare the actual frame number with the frame number data. If it is determined by either one of the above described comparison that the frame specification data does not correspond to the actual frame, the auto-printer is automatically changed from an auto-print mode to a manual print mode.

26 Claims, 4 Drawing Sheets

APPARATUS AND METHOD FOR CHECKING COINCIDENCE BETWEEN FRAME SPECIFICATION DATA AND AN ACTUAL FRAME OF AN AUTO-PRINTER

BACKGROUND OF THE INVENTION

The present invention relates to an apparatus and a method of checking whether frame specification data stored on a recording medium coincides with an actual frame placed in a printing position in an auto-printer. In particular, the invention relates to an apparatus for and a method of detecting whether an actual frame to be printed coincides with corresponding frame specification data previously stored on a recording medium. Such frame data is used for automatic exposure correction and for printing of the frame number onto a photographic print. The actual frame number is determined with reference to splice tapes and notches of the film, and the frame specification data is stored on a recording medium during an inspection process of the film in the form of frame number, position data, and corresponding exposure correction data.

In large scale photofinishing laboratories (hereinafter referred to as photo-lab), a great number of photographic films are automatically printed in an auto-printer after the respective photographic films are inspected by a notch puncher or a negative inspection function device. The notch puncher provides a semicircular notch to each original frame to be printed, in a conventional manner and, simultaneously, records frame specification data, including frame number data, frame position data, and exposure correction data of the frames to be printed onto a recording medium, such as a punch tape or an LSI memory card. The exposure correction data is entered for each original frame to be printed during the negative inspection process. When printing, the film to be printed and the corresponding recording medium are set in the auto-printer. The auto-printer seriatim places the original frame to be printed in a print position of the auto-printer with reference to the notches, and reads exposure correction data from the recording medium with reference to the frame position data, so as to correct the print-exposure amount according to the exposure correction data.

According to the above described conventional automatic exposure correction process, if the frame position data does not coincide with the actual frame placed in the print position, it is impossible to automatically select the proper exposure correction data based on the frame position data. Such may be caused when an error occurs in a film advancing section or in a notch detecting section of the auto-printer, or by erroneous operation. Of course, if the LSI memory card itself does not coincide with the film to be printed, then the frame specification data will not coincide with the actual frame placed in the print position.

In order to detect that the actual frame position does not coincide with the frame position data, a conventional device determines, while the film is advancing, an amount of film advancement from a splice tape to a leading notch as well as individual film advancing amounts between adjacent notches. The actual film advancing amount thus determined are then compared with the frame position data recorded in the recording medium. When the actual film advancing amount does not correspond to the frame position data, it is determined that the actual frame does not correspond to the frame specification data. However, because the distances between adjacent notches are substantially constant (e.g., about 38 mm for full-size 135-type film) with little variation, it is possible to overlook or not detect the misalignment between the actual film advancing amount and the frame position data. Thus, it is difficult to obviate the misalignment without delay. Consequently, a certain number of misprints such as printing of unnecessary frames, printing under improper exposure conditions, printing of incorrect frame numbers on the back of the prints, etc. results.

SUMMARY OF THE INVENTION

Accordingly, an object of the present invention is to provide a method of reliably and quickly detecting the misalignment of frame specification data with the actual frame to be printed in an auto-printer.

Another object of the present invention is to provide a method of printing a frame number onto an individual print in an auto-printer, wherein it is possible to quickly detect the misalignment of frame specification data with the actual frame and to automatically print the correct frame number onto the associated print.

The above and other objects are achieved by detecting frame number bar codes recorded on a side edge of a photographic film when placing each original frame into a print position of an auto-printer, determining the frame number of the original frame placed in the printing position based on the detected frame number bar codes, and comparing the actual frame number with frame number data stored during negative inspection so as to determine whether the frame number data corresponds to the actual frame number.

According to a second embodiment, the present invention accomplishes the above and other objects by determining whether the frame number data corresponds to the actual frame number on the basis of the frame number bar code recorded on the film, and comparing the frame position data read from a recording medium with a film advancing amount detected when advancing the film. Even when it is determined based on the film advancing amount that the frame number data corresponds to the actual frame number, the frame number determined based on the bar code data is compared with the stored frame number data. If it is determined based on the film advancing amount or the frame number bar code that the frame data does not coincide with the actual frame, a misalignment detection signal is generated, thereby automatically changing the auto-printer from an auto-print mode to a manual print mode.

In this way, it is possible to reliably and quickly detect a misalignment of the stored frame number data from the actual frame number of the frame placed in the printing position.

DETAILED DESCRIPTION OF PREFERRED EMBODIMENTS

Figure 1:
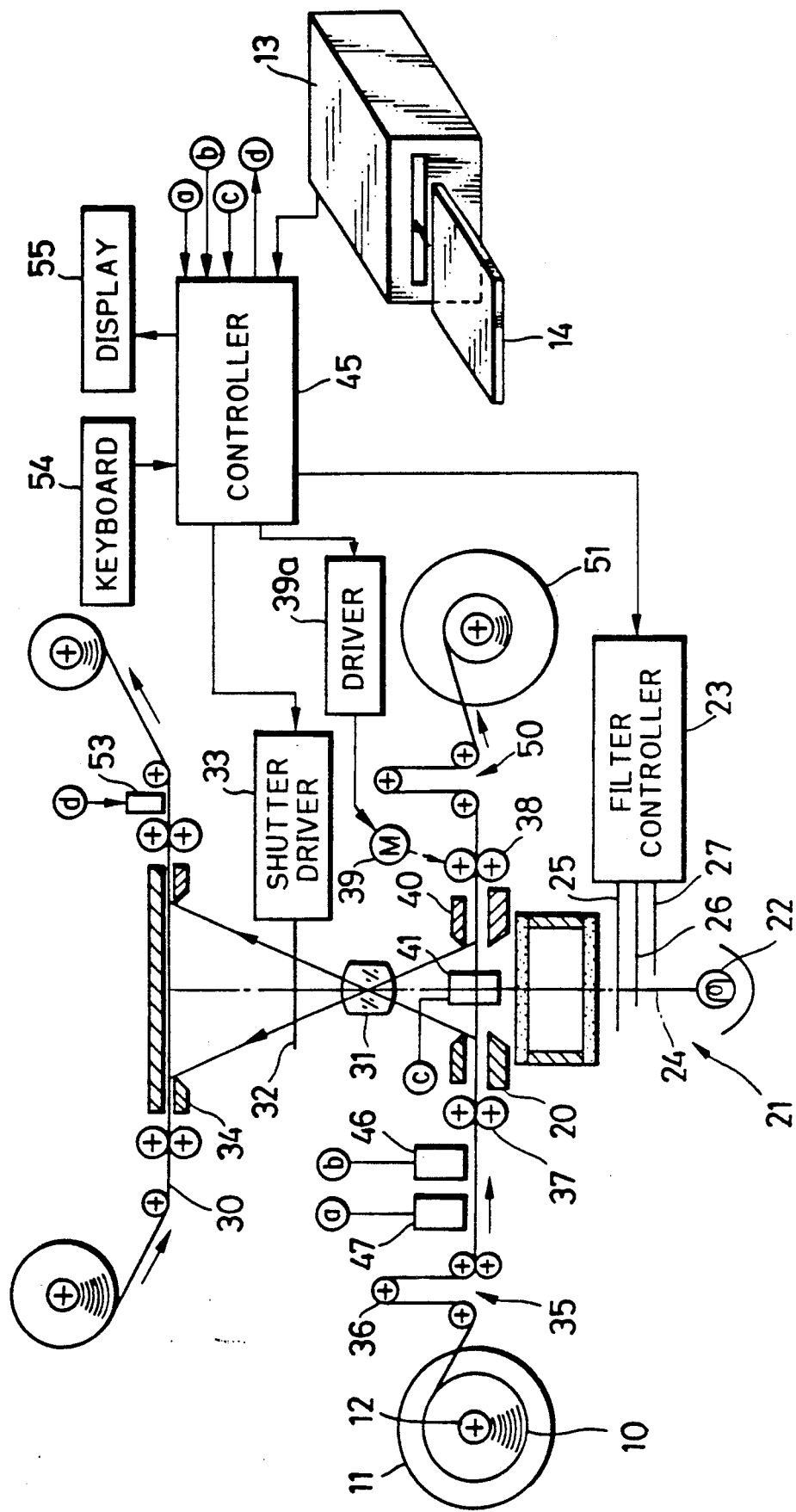
FIG. 1 shows the overall construction of an auto-printer embodying the present invention.

Referring to FIG. 1, there is shown a roll of photographic film, e.g. negative film 10, which is wound on a supply reel 11 after negative inspection, and which is mounted on a film supply shaft 12 of an auto-printer The auto-printer also includes an LSI card reader 13 for reading data, which is entered through a negative inspector or the like, stored on an LSI memory card 14.

Figure 2:
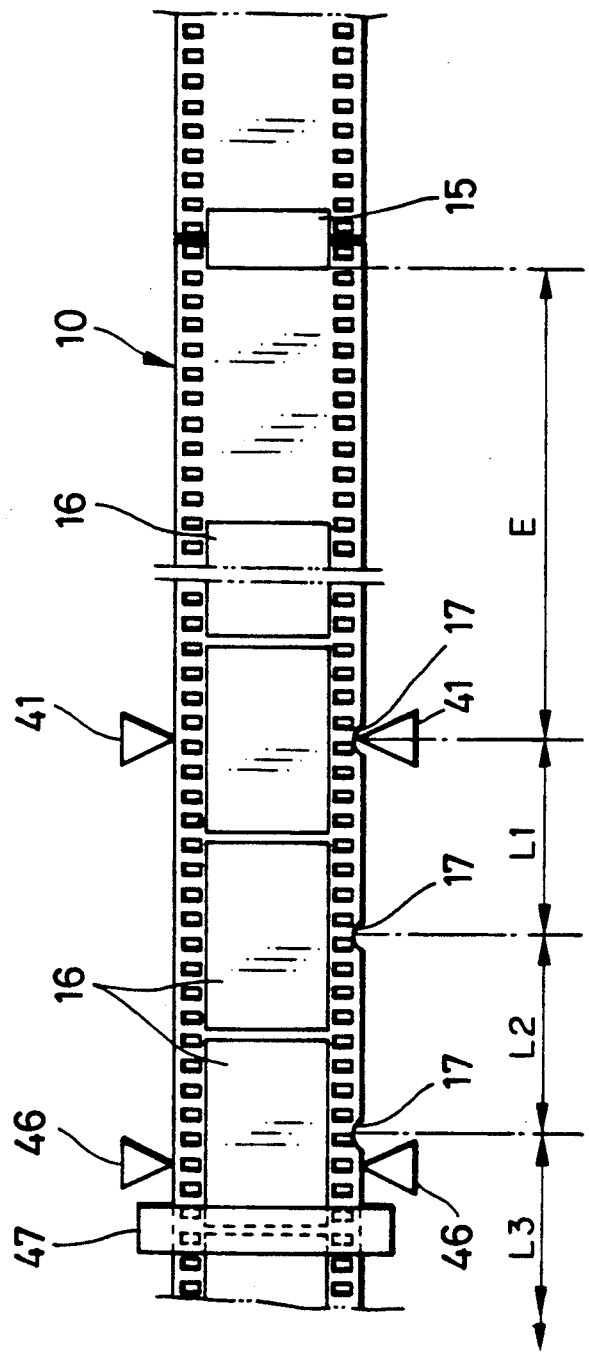
FIG. 2 shows a part of photographic film to be printed in the auto-printer in connection with sensors of the auto-printer.

As shown in FIG. 2, the roll of negative film 10 is composed of a large number of individual films spliced by splice tape 15. Among the original frames 16 recorded on the negative film 10, the frame to be printed is provided with a notch 17. The LSI memory card 14 has frame position data, frame number data and exposure correction data of each original frame 16, which are recorded therein in relation to the count number of notches allocated to the respective original frames, during negative inspection. The frame position data is, for example, distance data, which is indicative of a distance E from one of the splice tapes 15 to a leading notch 17, that is, the first notch 17 following the splice tape 15 in the film advancing direction, and distances L1, L2, L3, . . . between the notches 17.

Referring again to FIG. 1, the frame to be printed is seriatim placed in a film carrier 20 of the auto-printer. Below the film carrier 20, there is disposed a light source section 21 including a light source 22, a filter controller 23 and a mixing box 24. The filter controller 23 includes cyan, magenta and yellow color filters 25, 26 and 27, and controls an insertion amount of the three color filters 25 to 27 into an optical path 28 of printing light from the light source 22 so as to regulate color balance and intensity thereof. The mixing body 24 deequalizes the regulated printing light, and projects it toward the frame placed in the film carrier 20.

Above the film carrier 20, there are disposed a roll of photosensitive color paper 30, a printing lens 31, a shutter 32 and a paper mask 34. The printing lens 31 focuses the negative image in the frame onto the photosensitive emulsion layer of the color paper 30. The shutter 32 is driven by a shutter driver 33 to open for a given time so as to print the image onto the color paper 30.

A film advancing section 35 disposed before the film carrier 20 has a plurality of guide rollers 36 which are movable up and down relative to each other, to draw the film from the supply reel while maintaining the tension of the film 10 substantially constant. The film 10 thus transported to the film carrier 20 is placed in a print position of the film carrier 20 by pairs of film feed rollers 37 and 38 which are rotated by a motor, e.g., a pulse motor 39, driven by a driver 39a. In the print position, there are disposed a negative mask 40 for making the film 10 flat and a notch sensor 41. The notch sensor 41 detects the notch 17 formed in the film 10 in association to the frame to be printed, and outputs to a controller 45 a notch detection signal upon each detection of a notch.

Figure 3:
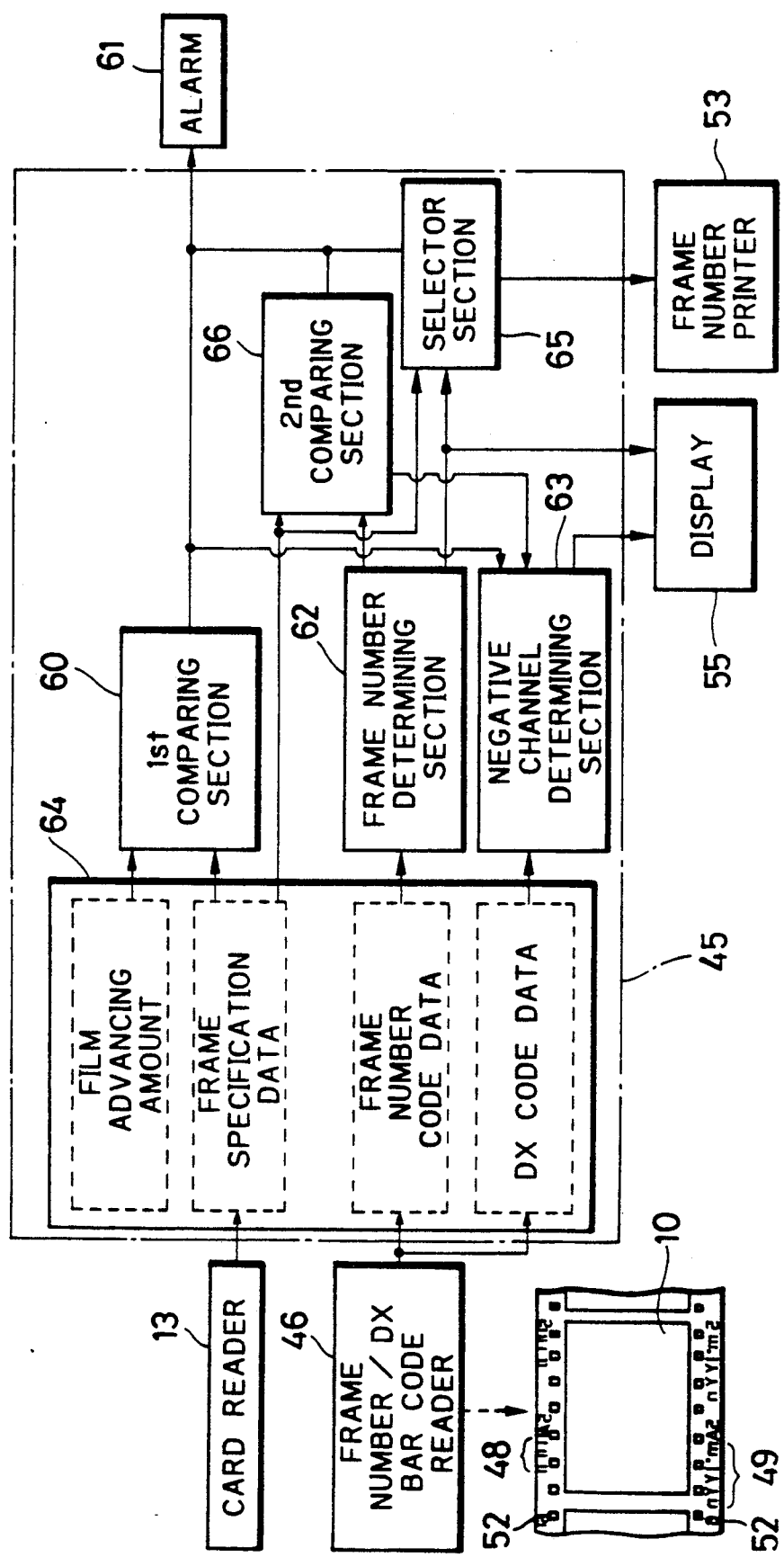
FIG. 3 is a functional block diagram of a controller of the auto-printer.

A bar code reader 46 and a splice sensor 47 are disposed between the guide rollers 36 and the film carrier 20. The bar code reader 46 reads frame number bar codes 48 and DX bar codes 49 recorded respectively on each side edge of the film 10 as shown in FIG. 3, which schematically illustrates the function of the controller 45 with regard to frame number detection. The bar code reader 46 outputs frame number code data and DX code data to the controller 45. The splice sensor 47 detects the splice tape 15 connecting the individual films 10. A splice detection signal output from the splice sensor 47 is also sent to the controller 45. The operation of the bar code reader 46 and the splice sensor 47 is described in more detail, for example, in U.S. patent application Nos. 07/315,673 and 07/315,863. The printed film 10 is advanced frame by frame by the feed roller pairs 37 and 38 toward a wind-up reel 51. Between the film carrier 20 and the wind-up reel 51, there are also guide rollers 50 which are movable up and down so as to maintain the tension of the film constant. It is to be noted that the film 10 also has visually readable frame numbers 52 recorded thereon.

A frame number printer 53 is disposed at the exit of the paper mask 34, so as to print the frame number of an original frame onto the back surface of the associated print frame on the color paper 30, in accordance with a frame number signal from the controller 45. The frame number printer 53 may in addition to the frame number, print also exposure correction data, customer order number data, etc.

The controller 45 is a conventional microcomputer or the like which includes a ROM and sequentially controls the respective sections of the auto-printer according to a program stored in the ROM. The controller 45 also detects misalignment between the frame specification data and the actual frame placed in the print position, and controls the frame number printer 53 and other necessary sections so as to process the misalignment between the actual frame and frame specification data. A keyboard 54 for entering various commands and a display 55 for displaying the commands and various data are connected to the controller 45.

Figure 4:
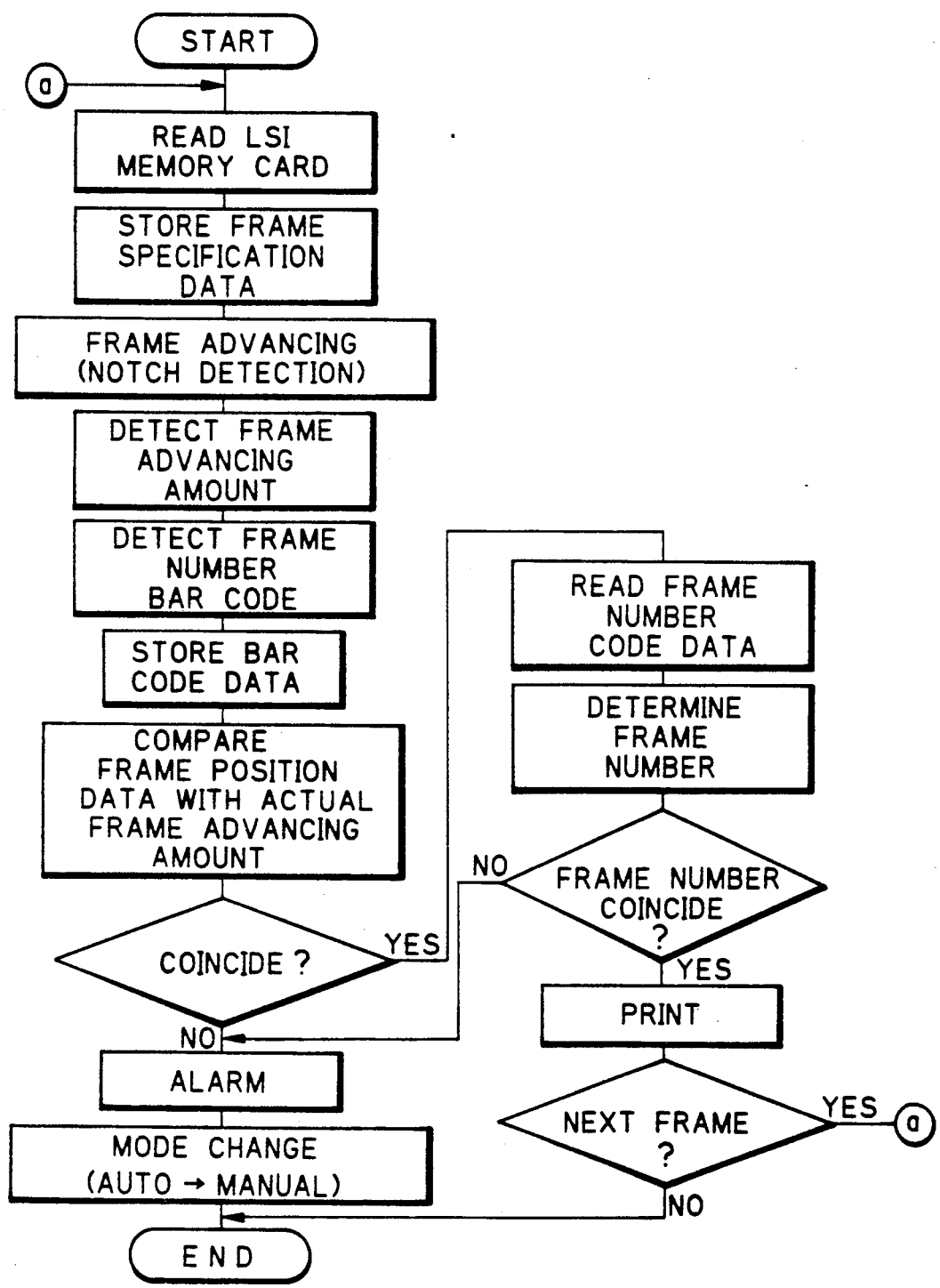
FIG. 4 is a flow chart explaining the procedure of detecting and processing a misalignment between the actual frame position and the frame position data.

The process of detecting a misalignment between the frame specification data and the actual frame position according to the present embodiment will now be described with reference to FIGS. 3 and 4.

First, the film 10 wound on the film supply reel 11 is mounted on the film supply shaft 12, and the LSI memory card corresponding to the film 10 is placed in the LSI card reader 13. The free end of the film 10 having a film leader sheet is manually connected to the wind-up reel 51 passing through the film carrier 20. Thereafter, the controller 45 starts positioning the respective frame to be printed into the print position based on the notch detection signal from the notch sensor 41. The positioning of the frame is performed by advancing the film 10 by a constant amount after the time of detecting a notch. When the frame is properly placed in the printing position, a print exposure amount for this frame is determined after making corrections based on the exposure correction data stored for the respective frames in the LSI memory card 14. After each printing cycle, both the color paper 30 and the film 10 are advanced by one frame to print the next frame. During this frame advancing, the frame number and other information are printed on the back surface of the print frame.

Simultaneously with the just described auto-printing process, the controller 45 determines whether the frame specification data coincides with the actual frame position in the following manner. First, the film advancing amount from the splice tape 15 to the leading notch 17 and the amount from one notch to the next is detected when the film is being advanced by counting the number of pulses supplied to the pulse motor 39. Then, the actual film advancing amount is compared with the frame position data E, L1, L2, . . . read from the LSI memory card 14 in a first comparing section 60, as shown in FIG. 3. If the actual film advancing amount does not correspond to the frame position data, the first comparing section 60 outputs a misalignment detection signal and the controller 45 switches the auto-printer from an auto-print mode to a manual print mode. The controller 45 also sends the misalignment detection signal to an alarm 61, a negative channel determining section 63 and a selector section 65. The alarm 61 sounds in response to the misalignment detection signal.

The controller 45 activates the bar code reader 46 during auto-printing, which reads the frame number bar codes and the DX bar codes recorded on the film 10. The detected bar codes are stored as frame number bar code data and DX code data in a memory section 64 at appropriate addresses. A frame number determining section 62 determines the frame number of the frame placed in the print position by a calculation based upon the frame number bar code data read from the memory section 64. The method of determining the frame number based on the frame number bar code is disclosed in more detail, for example, in U.S. Pat. No. 4,918,484 which is incorporated by reference to the extent necessary. Data corresponding to the determined frame number is then sent to a second comparing section 66 and a selector section 65 as well as to the display 55.

The second comparing section 66 compares the frame number bar code data calculated by the frame number determining section 62 with the frame number data read from the LSI memory card 14, and outputs a misalignment detection signal when the two data are not identical. At that time, the controller 45 switches the auto-printer from the auto-print mode to the manual print mode in the same manner as when the first comparing section outputted the misalignment detection signal. The misalignment detection signal from the second comparing section 66 is also sent to the alarm 61, the negative channel determining section 63 and the selector section 65.

The selector 65 sends to the frame number printer 53, the frame number data of the frame specification data read from the LSI memory card 14 in the auto-print mode. However, upon receipt of the misalignment detection signal, the selector 65 sends to the frame number printer 53, the frame number data determined in the frame number determining section 62 based on the frame number bar code data.

The negative channel determining section 63 determines, upon receipt of the misalignment detection signal, a negative channel of the film to be printed, based on the DX code data read from the film during auto-printing, with reference to a look-up table memory, so as to display the negative channel on the display 55 when it is requested by an operator via the keyboard 54.

In the manual print mode, the operator visually observes the frame to be printed so as to enter necessary exposure correction data. The manual print mode is continued, for example, to the last frame to be printed for an individual film for the case when the auto-printer automatically changes to the manual print mode. Thereafter, the frame specification data from the LSI memory card 14 is adjusted to the actual frame of another individual film, and then the auto-printer is changed over to the auto-print mode.

Although the film advancing amount is indirectly detected by counting the drive pulses of the pulse motor 39 which cause the film advancing roller pairs 37 and 38 to rotate as described above, it is possible to directly detect the film advancing amount by other methods which would be obvious to those skilled in the art in light of the invention described herein.

It will be understood that the present invention is not intended to be limited by the above described embodiment, but, on the contrary, various modifications of the present invention can be effected without departing from spirit and scope of the appended claims.

What is claimed is:

1. A method of checking whether frame specification data stored on a recording medium coincides with a frame of a photographic film placed in a print position in an auto-printer, wherein said frame specification data comprises frame number data, frame position data, and exposure correction data for each frame to be printed, said method comprising the steps of:

detecting a frame number code recorded on said photographic film with the respective original frames when the frame is advanced to be printed toward the print position;

determining, based on said frame number code, an actual frame number of the frame placed in said print position and outputting actual frame number data;

comparing said actual frame number data with said frame number data read from said recording medium; and determining whether said frame of photographic film placed in said print position coincides with said frame specification data stored on said recording medium.

2. A method as recited in claim 1, further comprising the step of printing said frame number onto a back surface of a photographic print, said frame number being determined based on said frame number data stored in said recording medium.

3. A method as recited in claim 1, wherein said frame number code is a bar code.

4. A method as recited in claim 2, further comprising the step of changing the auto-printer from an auto-print mode to a manual print mode when it is determined that the frame specification data does not coincide with the frame to be printed.

5. A method as recited in claim 4, wherein, when in said manual print mode, said method further comprises the step of automatically printing said frame number onto the back surface of said photographic print using said frame number determined based on said frame number code.

6. A method as recited in claim 5, further comprising the step of generating an alarm when it is determined that said frame specification data does not coincide with the frame to be printed.

7. A method as recited in claim 6, further comprising the step of displaying a negative channel corresponding to said photographic film to be printed when it is determined that said frame specification data does not coincide with the frame to be printed.

8. A method as recited in claim 7, wherein, when in said manual print mode, said method further comprises the step of manually entering necessary exposure correction data through a keyboard.

9. A method as recited in claim 8, wherein said recording medium is an LSI memory card.

10. A method as recited in claim 9, further comprising the steps of:

detecting an amount of advancement of said photographic film when advancing the film; and comparing said detected amount of advancement with said frame position data stored in said recording medium, so as to determine whether the frame specified by the data coincides with the frame to be printed.

11. A method of checking whether frame specification data stored on a recording medium coincides with a frame placed in a print position in an auto-printer, wherein said frame data comprises frame number data, frame position data, and exposure correction data for each frame to be printed, said method comprising the steps of:

(a) detecting advancement of said photographic film;

(b) detecting a frame number code recorded on said photographic film that is associated with the respective frames, when advancing said frame to be printed toward said print position;

(c) determining, based on said frame number code, an actual frame number of said frame placed in the print position;

(d) comparing a detected amount of advancement with said frame position data stored on said recording medium; and (e) comparing said actual frame number determined in step (c) with said frame number data of said frame specification data read from said recording medium; and (f) determining whether said frame placed in the print position coincides with said frame specification data read from said recording medium based on results of step (d) and (e).

12. A method as recited in claim 11, further comprising the step of printing said frame number of the frame onto a back surface of a consequent print based on said frame number data stored in said recording medium.

13. A method as recited in claim 10, further comprising the step of changing the auto-printer from an auto-print mode to a manual print mode when it is judged that said frame specification data does not coincide with said actual frame number.

14. A method as recited in claim 13, wherein, when in said manual print mode, said method further comprises the step of automatically printing said frame number onto a back surface of a consequent print frame using said frame number determined based on said frame number bar code.

15. A method as recited in claim 14, further comprising the step of generating an alarm when it is judged that said frame specification data does not coincide with said actual frame number.

16. A method as recited in claim 15, further comprising the step of displaying a negative channel corresponding to the photographic film to be printed when it is judged that said frame specification data does not coincide with said actual frame number.

17. A method as recited in claim 16, wherein, when in said manual print mode, said method further comprises the step of manually entering necessary exposure correction data through a keyboard.

18. A method as recited in claim 17, wherein said recording medium is an LSI memory card.

19. An auto-printer for automatically printing each frame of a photographic film at an optimum exposure amount based on exposure correction data stored on a recording medium during negative inspection, said auto-printer comprising:

means for reading frame specification data comprising frame number data, frame position data, and the exposure correction data for each frame to be printed from said recording medium;

means for detecting advancement of the photographic film;

means for detecting a frame number code recorded on the photographic film in association with the respective frames, said frame is advanced to be printed toward a print position;

means for determining, based on said frame number code, an actual frame number of a frame placed in said print position;

first comparing means for comparing a detected amount of advancement with said frame position data stored in said recording medium to determine whether said frame specified by said frame data coincides with said actual frame placed in said print position;

second comparing means for comparing said actual frame number with said frame number data read from said recording medium; and means for determining whether said frame specified by said frame data coincides or not with said actual frame placed in said print position when one of said first and second comparing means determines that the compared two elements do not coincide.

20. An auto-printer as recited in claim 19, further comprising means for printing said frame number of the frame onto a back surface of a consequent photographic print.

21. An auto-printer as recited in claim 20, further comprising means for changing said auto-printer from an auto-print mode to a manual print mode when it is judged that said frame specification data does not coincide with said actual frame number.

22. An auto-printer as recited in claim 21, wherein said frame number printing means automatically prints said frame number based on said frame number data stored in said recording medium in said auto-print mode, and in said manual print mode, said frame number printing means automatically prints said frame number determined based on said frame number bar code.

23. An auto-printer as recited in claim 22, further comprising means for generating an alarm when it is judged that said frame specification data does not coincide with said actual frame number.

24. An auto-printer as recited in claim 23, further comprising means for displaying a negative channel corresponding to said photographic film to be printed when it is judged that said frame specification data does not coincide with said actual frame number.

25. An auto-printer as recited in claim 24, further comprising a keyboard for manually entering necessary exposure correction data in said manual print mode.

26. An auto-printer as recited in claim 25, wherein said recording medium is an LSI memory card.

* * * * *